United States Patent [19]

Ballard et al.

[11] Patent Number: 5,377,281
[45] Date of Patent: Dec. 27, 1994

[54] KNOWLEDGE-BASED CHARACTER RECOGNITION

[75] Inventors: Bruce W. Ballard, Durham, N.C.; Mark A. Jones, New Providence, N.J.; Guy A. Story, New York, N.Y.

[73] Assignee: AT&T Corp., Murray Hill, N.J.

[21] Appl. No.: 853,559

[22] Filed: Mar. 18, 1992

[51] Int. Cl.⁵ .............................. G06K 9/72
[52] U.S. Cl. .................... 382/40; 382/36; 382/37; 382/39; 382/57
[58] Field of Search ............ 382/14, 40, 39, 37, 382/57, 36

[56] References Cited

U.S. PATENT DOCUMENTS

| | | | |
|---|---|---|---|
| 3,969,700 | 7/1976 | Bollinger et al. | 382/40 |
| 4,058,795 | 11/1977 | Balm | 382/40 |
| 4,654,875 | 3/1987 | Srihari et al. | 382/40 |
| 5,133,023 | 7/1992 | Bokser | 382/40 |
| 5,161,245 | 11/1992 | Fenwick | 382/40 |

OTHER PUBLICATIONS

J. J. Hull and S. N. Srihari, "Comparison of Two Contextual Post-Processing Algorithms for Text Recognition," IEEE, 1982, pp. 146-151.
J. J. Hull, S. N. Srihari and R. Choudhari, "An Integrated Algorithm for Text Recognition: Comparison with a Cascaded Algorithm," IEEE Transactions on Pattern Analysis and Machine Intelligence, vol. PAMI-5, No. 4, Jul. 1983, pp. 384-395.
S. N. Srihari, J. J. Hull and R. Choudhari, "Integrating Diverse Knowledge Sources in Text Recognition," ACM Transactions on Office Information Systems, vol. 1, No. 1, Jan. 1983, pp. 68-87.
S. N. Srihari, J. J. Hull and R. Choudhari, "Integration of bottom-up and top-down contextual knowledge in text error correction," National Computer Conference, 1982, pp. 501-508.
M. A. Jones, G. A. Story, B. W. Ballard, "Integrating Multiple Knowledge Sources in a Bayesian OCR Post-Processor," ICDAR-91 Conference Proceedings, St. Malo, France, Summer 1991, pp. 925-933.

Primary Examiner—David K. Moore
Assistant Examiner—Phuoc Tran
Attorney, Agent, or Firm—Henry T. Brendzel

[57] ABSTRACT

Character string recognition and identification is accomplished with a combined, multi-phase top-down and bottom-up process. Characters in an applied signal are recognized with a process that employs a knowledge source which contains information both, about the basic elements in the signal and about strings of the basic elements in the signal. The knowledge source, which may be derived from a training corpus, includes word probabilities, word di-gram probabilities, statisitics that relate the likelihood of words with particular character prefixes, and rewrite suggestions and their costs. Higher level word n-grams, such as word tri-gram probabilities, can also be used. A mechanism is provided for accepting words that are not found in the knowledge base, as well as for rewrite suggestions that are not in the knowledge base.

29 Claims, 6 Drawing Sheets

FIG. 1

| WORD | COST |
|---|---|
| the | 91 |
| , | 98 |
| .[ | 99 |
| of | 103 |
| to | 104 |
| a | 106 |
| . | 112 |
| said | 114 |
| for | 119 |
| that | 119 |
| "[ | 120 |
| 's | 120 |
| is | 124 |
| with | 125 |
| it | 125 |
| by | 127 |
| at | 127 |
| be | 131 |
| have | 131 |
| " | 131 |
| , | 131 |
| an | 132 |
| his | 133 |
| has | 133 |
| are | 133 |
| not | 134 |
| ) | 136 |
| would | 137 |
| had | 137 |
| chinatex | 300 |
| non-speculator | 300 |
| honorability | 300 |
| $1.808 | 300 |
| in accordance with this invention | 1500 |
| the system | 600 |
| is computed for | 1000 |

FIG. 2

| OCR OUTPUT | INPUT | COST |
|---|---|---|
| 'n | Th | 63 |
| 'M | Th | 63 |
| & | dr | 42 |
| ' | ' | 0 |
|  |  | 33 |
|  |  | 123 |
| 'I | T | 68 |
| ) | ) | 59 |
| , |  | 0 |
|  | ; | 45 |
|  | . | 83 |
|  |  | 144 |
| – | – | 1 |
|  |  | 83 |
| E | E | 0 |
|  | li | 68 |
|  | i | 102 |
| T | T | 0 |
|  | le | 74 |
| U | U | 0 |
|  | kl | 16 |
|  | ll | 71 |
| Y | Y | 1 |
|  | y | 88 |
| 1E | Hi | 27 |
| Kh | Mi | 18 |
| A& | Mr | 36 |
| N4 | M | 55 |
| i' | r | 106 |
| I– | H | 49 |
| i– | r | 106 |
| iff | m | 92 |
| Vi( | W | 50 |
| I–I | H | 54 |
| I–I | H | 44 |

FIG. 3

| PREFIX | LENGTH | COST | (WORD WITH LEAST COST) |
|--------|--------|------|------------------------|
| t      | 4      | 104  | to                     |
|        | 6      | 91   | the                    |
|        | 8      | 119  | that                   |
|        | ⋮      | ⋮    | ⋮                      |
| th     | 6      | 91   | the                    |
|        | 8      | 119  | that                   |
|        | ⋮      | ⋮    | ⋮                      |
| tha    | 8      | 119  | that                   |
|        | 10     | 205  | thank                  |
|        | ⋮      | ⋮    | ⋮                      |
| b      | 4      | 127  | by                     |
|        | 6      | 132  | but                    |
|        | 8      | 139  | been                   |
|        | 9      | 186  | below                  |
|        | 12     | 152  | before                 |
|        | ⋮      | ⋮    | ⋮                      |
| be     | 4      | 131  | be                     |
|        | ⋮      | ⋮    | ⋮                      |
| bel    | 6      | 197  | bell                   |
|        | 10     | 207  | belief                 |
|        | 12     | 172  | believe                |

KNOWLEDGE-BASED CHARACTER RECOGNITION

BACKGROUND OF THE INVENTION

1. Field of the Invention

This invention relates to categorization of signals in the presense of noise. More particularly, this invention relates to the categorization of characters and the like with the aid of knowledge sources. One specific area where this invention finds use is optical character recognition (OCR) of text.

2. Description of the Prior Art

Optical character recognition is a fast-advancing field, although current OCR machines are still limited in their ability to recognize characters with close to 100% accuracy. The ability of OCR machines is not poorer than that of human beings when they are asked to identify a character in isolation. But, humans employ contextual factors such as letter sequences, word dependency, and sentence structure, coupled with inference, comprehension, and imagination; and those factors make the human decisions superior.

In light of the above, it is clear that automated OCR processes need to use contextual knowledge sources to enhance the recognition process. Indeed, that is what most treatises on this subject suggest, and the two basic approaches that can be discerned in the prior art are the bottom-up approach and the top-down approach. The bottom-up approach proceeds by refining successive estimates of the input string of characters. Such an approach might take into account, for example, the probability of a letter occurring given the set of letters that occurred previously. The top-down approach assumes knowledge of the possible set of end results and tries to fit the input to those end results. The typical assumption is that the input words are found in the dictionary.

One combined approach was suggested by Shinghal and Toussaint in "A bottom-up and top-down approach to using context in text recognition", Int. J. Man-Mach. Stud. 11 (1979), pp. 201–212. In their system, after a bottom-up segment of the process is completed, a dictionary is consulted to determine whether the determined word is valid. If the word does not correspond to a dictionary word, then the word is assumed to be incorrect. Correction is achieved by determining the dictionary word whose score is nearest to that of the word under consideration.

More recently, Hull, Srihari and Choudhari published three articles that also describe an effort to integrate the top-down and the bottom-up approaches into a single process. Because of the similarity of the three articles (at least as they relate to this invention) only one is summarized below. These articles are: "An integrated Algorithm for text recognition: comparison with a cascaded algorithm", IEEE Transaction on Pattern Analysis and Machine intelligence, Vol PAMI-5, No. 4, July 1983, pp. 384–395; "Integrating Diverse Knowledge sources in text recognition", ACM Transactions on Office Information Systems. Col 1, No. 1, January 1983, pp. 68–87; and "Integration of bottom-up and top-down contextual knowledge in text error correction", Proceedings of the National Computer Conference, 1982, pp. 502–508.

Basically, as part of the bottom-up aspect of their algorithm, Hull at et look at the observed word X which is made up of the character sequence $X_0X_1 \ldots X_mX_{m+1}$ (where $X_0$ and $X_{m+1}$ are the delimiters) and assess the probability that the true word which caused X to be read is Z. By using Bayes theorem and assuming that the word is generated by a 1st-order Markov source, Hull et al determine that the true word, Z, (which is made up of the character sequence $Z_0Z_1 \ldots Z_mZ_{m+1}$, where $Z_0$ and $Z_{m+1}$ are the delimiters) is one which maximizes the expression $$\sum_{i=1}^{m+1} [\log P(X_i/Z_i) + \log P(Z_i/Z_{i-1})]. \quad (1)$$

The above represents the bottom-up portion of the process. As for the top-down portion, according to Hull et al, testing against a dictionary as Shinghal et al suggest results in a choice that is not necessarily the most likely word, in the sense of a posteriori probability. Therefore, they propose a different approach.

In their approach, which they dubbed the "dictionary Viterbi algorithm", at each stage of the algorithm they determine whether, with the given string as a prefix, the next letter forms a string that is found in the dictionary. They assume that the word delimiters are recognized perfectly by the system, and that yields the length of the word, m, that needs to be identified. At each step in the Viterbi process, they determine whether or not the next character appears in an m-length word dictionary following the initial substring (i.e., prefix). If a character does not appear in such a dictionary, then it is not selected. In effect, at each step they determine the legality of a given string with respect to the limited dictionary of m-length words.

This is a step in the right direction, but it does not go far enough in accounting for other kinds of information that are available and which can be brought to bear on improving the recognition process.

SUMMARY OF THE INVENTION

In accordance with the present invention, the basic elements (characters, symbols, tokens, etc.) in an applied signal are recognized and characterized in a multiphase process that employs a knowledge source which contains information both, about the basic elements in the signal and about strings of the basic elements in the signal. In connection with text characters, for example, this invention utilizes information about characters, about strings of characters that make up words, and about relationships between words.

In one embodiment of this invention the information is derived from a training corpus of text. Information is derived about the likelihood of errors in mapping m letters to n letters, where m and n are integers (including zero) that are not necessarily the same. In addition, the likelihood of character strings that make up words is considered, as well as the likelihood of word sequences, such as word pairs.

To enhance operations of the process, it is recognized that all valid words may not be found in the training text, and indeed, that not all valid words can be found in any one dictionary. Therefore, this invention includes a mechanism for allowing the introduction of new valid words. Similarly, it is recognized that not all possible errors in mapping one character sequence to another character sequence will be encountered in the training set and, therefore, this invention includes a mechanism for allowing untrained-for errors in mapping to be recognized and accepted. Lastly, a process is provided for the consideration of word sequences, to suggest word candidates for further evaluation, which words may not have been fully considered (or considered and discarded) earlier.

DETAILED DESCRIPTION

Although the principles of this invention are applicable to a number of areas where signals corrupted by noise need to be detected, identified and categorized, to simplify the description that follows only character recognition of written text is described in detail. Moreover, it is assumed for purposes of this disclosure, that words are scanned, lines of text are identified, and the string of perceived characters is created prior to the application of the processes described below. It should be understood, however, that the terms "character" and "word" have a meaning that is broader than characters and words of a written language. This invention encompasses all contexts where basic information elements can be viewed as characters and where strings of characters make up words that have a higher level meaning in the same context.

As indicated above, one principal aspect of this invention is the use of a knowledge source to assist in analyzing and rewriting the applied string of characters so as to form a final determined string of characters that comprises words in a sequence that is likely to make sense.

This knowledge source is created by analyzing a large body of known text and deriving therefrom the needed information. This is the training phase.

The Training Phase word probabilities table

One corpus of information that is derived during the training process is a collection of valid words together with their probabilities. This collection forms a dictionary. The probabilities are derived by counting the number of times a given word appears in the text, divided by the number of words in the training text. Since the above analysis can be carried out solely on the applied known text, no character recognition is needed at this point.

Figure 1:
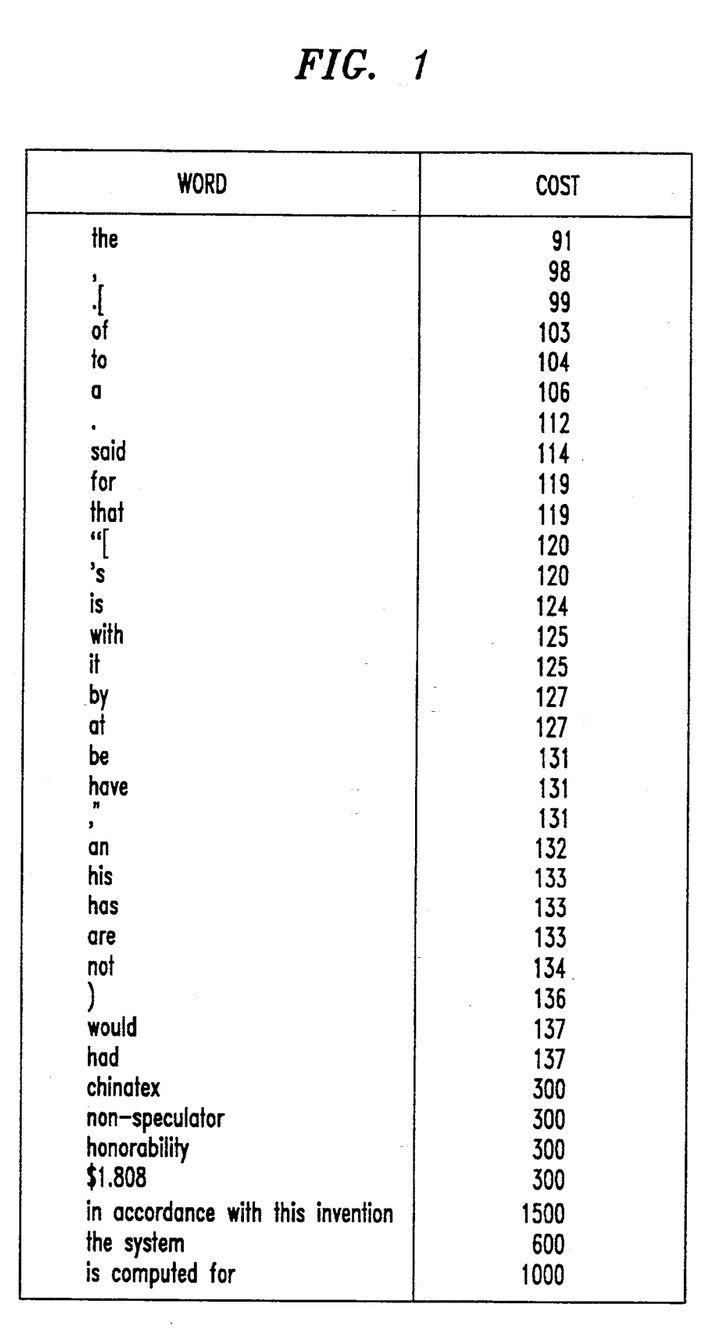
FIG. 1 presents a few entries in a word probabilities table, depicting words and their costs, the latter being the negative of the log of their probabilities.

The valid words found in the training corpus, and their probabilities of occurrence, are combined in a word probabilities table which includes a listing of the different words found in the training text and the negative of the log of their probabilities of occurrence, p (multiplied by 10). The -10log p is, in effect, a cost measure associated with the word. This is depicted in FIG. 1.

The table just described can be termed a "uni-gram" dictionary. A "digram" dictionary is also created which identifies word pairs and their associated cost.

To enhance the applicability of the training text vis-a-vis the word probabilities table, it is advantageous to employ a training text that is in the general field of the text that is expected to be analyzed by the system after the training phase. Such a related training text increases the likelihood that words found in analyzed text will have been encountered during training. Even with a well chosen body of training, however, it is accepted that not all valid words will be found in the training text. In fact, when dealing with a living language, no dictionary exists that truly encompasses all valid words of the language. With this recognition in mind, our word probabilities table is augmented with an algorithm for developing an expected probability of a word that is found in analyzed text but is not found in the body of the training text. We determined that a useful measure of the expected probability of an unknown word is expressed by the equation $$\left\{ \prod_{i=0}^{n} p_i \right\}^{\frac{1}{n+1}} C_{rare}, \qquad (2)$$

where n is the number of letters in the word, $C_{rare}$ is some selected estimate of a real word existing which the training session hasn't seen, and $p_i$ is the probability of the $i^{th}$ letter digram of the unknown word generally occurring in text. The set of probabilities of letter digrams and letter trigrams are obtained from the training corpus of information. For example, the probability for the word "gork" is the product of the letter digram probabilities: " g", "go", "or", "rk" and "k " (where " " stand for the blank delimiter.

rewrite probabilities table

The errors encountered during the training session provide another very valuable source of information, and that is the set of likely rewrites that may need to be applied to correct errors that are likely to occur. Unlike the prior art that limits itself to 1-to-1 rewrites, this invention offers a very wide range of rewrite probabilities. It is expected, however, that character strings that involve three characters will be quite rare, and those that involve four characters will be even rarer. Of course, there may be applications where rewrites of greater numbers of characters may be appropriate.

To develop this source of knowledge, the training text is applied to the "Recognition" segment of the OCR process that is used to scan the text, and the OCR-recognized characters are compared to the known text of the training set. What results is a collection of instances where input words are corrupted, and those instances are analyzed in order to create character sequence rewrite suggestions. It may be noted in passing, that prior to actually analyzing the OCR output and comparing it to the true text it is useful to align the words in a line of text with the words in a line of OCR output. Because of the noise in the OCR process, aside from basic character corruptions, there is a possibility that some words in the OCR text are really a combination of more than one word in the true text (when a space between two words in the true text is too small), or vice-versa (when a space between characters is too big). Based on word length considerations, words in the OCR output are associated with words in the input text, and only then rewrite considerations take place. In this association, one or more words in the OCR output may be associated with a word in the input text, and/or a word in the OCR output may be associated with one or more words in the input text.

It may also be noted that, as in connection with the word probabilities table, it is advantageous to employ a training text that is in the field of the text that is expected to be analyzed by the system after the training phase. A related training text enhances the probability that rewrite suggestions which are created (as described below) are tailored well to the expected text. For example, when the text to be analyzed relates to theater arts, a word like "rete" is likely to be a corrupted version of the word "role". Conversely, if the text to be analyzed relates to medicine, the word "role" may actually be a corrupted version of the word "rete". Obviously, different rewrite suggestions would be created for the two situations.

To illustrate, the following presents a sample of the kind of OCR errors that may be encountered, and with each sample there is an associated set of rewrite suggestions. It is noteworthy that most of the rewrites involve a character being left unchanged.

(a) read string = "t.he", true string = "the"
"t" -> "t"
"." -> ""
"h" -> "h"
"e" -> "e"

(b) read string = "die", true string = "the"
"di" -> "th"
"e" -> "e"

(c) read string = "end.rbe", true string = "end. The"
"e" -> "e"
"n" -> "n"
"d" -> "d"
"." -> "."
"r" -> "T"
"b" -> "h"
"e" -> "e"

(d) read string = "I-Iis", true string = "His"
"I-I" -> "H"
"i" -> "i"
"s" -> "s"

On first blush, it might be expected that merely comparing the OCR'ed text with the true text would yield all of the rewrite suggestions that are necessary to transform the OCR'ed text to the true text. In fact, that is not the case. Instances can occur where word corruptions are such that a mere comparison will not suffice. For example, when the true text word is "committee" and the OCR'ed text is "coiniidtee" it is not at all clear how to transform "iinid" to "mmit". It could be
"ii" -> "m"
"n" -> "m"
"i" -> "i"
"d" -> "t"
but it could also be
"ii" -> "m"
"ni" -> "m"
"d" -> "it".

To assist in deciding which of the possible sets of rewrites to accept, the probability expression $$p(x \rightarrow y) = (1 - p_I) \frac{2^{penalty(x,y)}}{\sum_\alpha 2^{penalty(x,\alpha)}} \quad (3)$$

provides a measure for selecting a rewrite suggestion sequence that is most probable.

In equation (3),
  x is the string that is a candidate for a rewrite,
  y is the x string when rewritten,
  $p_I$ is the probability $p(x\text{->}x)$,
  $\alpha$ ranges over the set of all strings of length <3 that do not contain string x
  $\text{Penalty}(x,y) = C_W \delta_W + C_A \delta_A + C_D \delta_D$
  $\delta_W$ = difference in OCR width between string x and string y
  $\delta_A$ = difference in ascenders between string x and string y
  $\delta_D$ = difference in descenders between string x and string y
  $C_W$ = relative weight for width term (empirical property)
  $C_A$ = relative weight for ascender term (empirical property)
  $C_D$ = relative weight for descender term (empirical property)

OCR widths are crudely estimated for proportional spacing fonts. For example,
  characters of width 1: ijlI[]()​{}.,;:"/!" and space
  characters of width 3: ABCDEFGHKLNOPQRSUVXYZmwq
  characters of width 4: =MW
  characters of width 2: all others.

Figure 2:
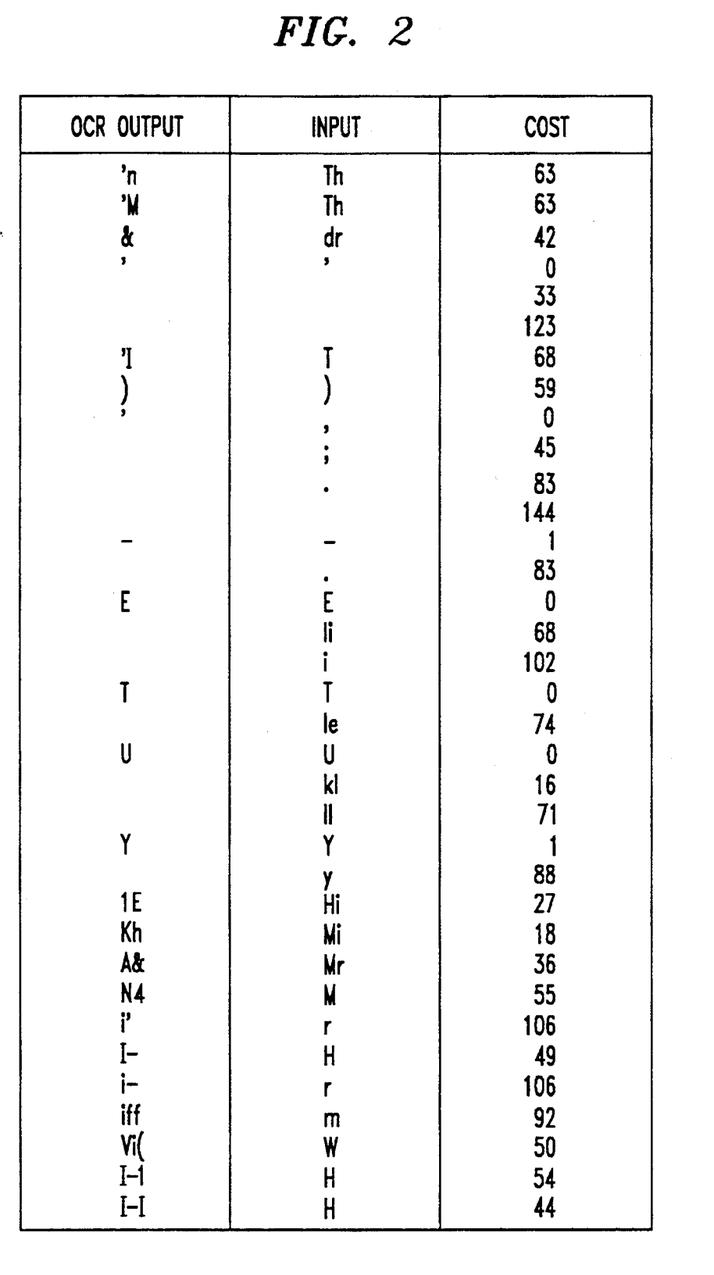
FIG. 2 presents a few entries in a rewrite suggestions table, together with their costs.

Thus, with the true text and the OCR'ed text analyzed, and armed with the above-described expression to resolve ambiguities, a rewrite probability table is created. In accordance with our invention, the table includes rewrite suggestions to transform from the one extreme of 0 character to 3 characters, to the other extreme of 3 characters to 0 characters (and, of course, any m character string to n character string, in between). This is illustrated in FIG. 2.

text attributes table

To assist in the search procedure itself, a body of knowledge is created which comprises word prefixes, word lengths, and the most likely words that are associated with the word prefixes. One and two letter word prefixes are employed in our implementation but, of course, table with still longer prefixes are beneficial, as long as the derived benefits are not too dear in terms of the increased memory requirement. In our implementation, for example, a word such as "below" is associated with the prefixes "b", "be", and "bel". Although "below" may not be the most likely word with the prefix "b", it is still a valid word that may be selected when he prefix is "b". Similarly, although "below" may not be the most likely word with the prefix "bel", it is still a valid word that may be selected when the prefix is "bel". Longer prefixes are, of course, possible.

The word length in our embodiment is not merely the number of characters. Rather, as suggested above, character widths are incorporated in the length calculation. For example, the length of "b" = 2, "e" = 2, "l" = 1, "o" = 2, and "w" = 3. Therefore, the length of the string "below" is 8. From among words with a length 8 and a prefix "bel", the word "below" may indeed be the most likely word.

Figure 3:
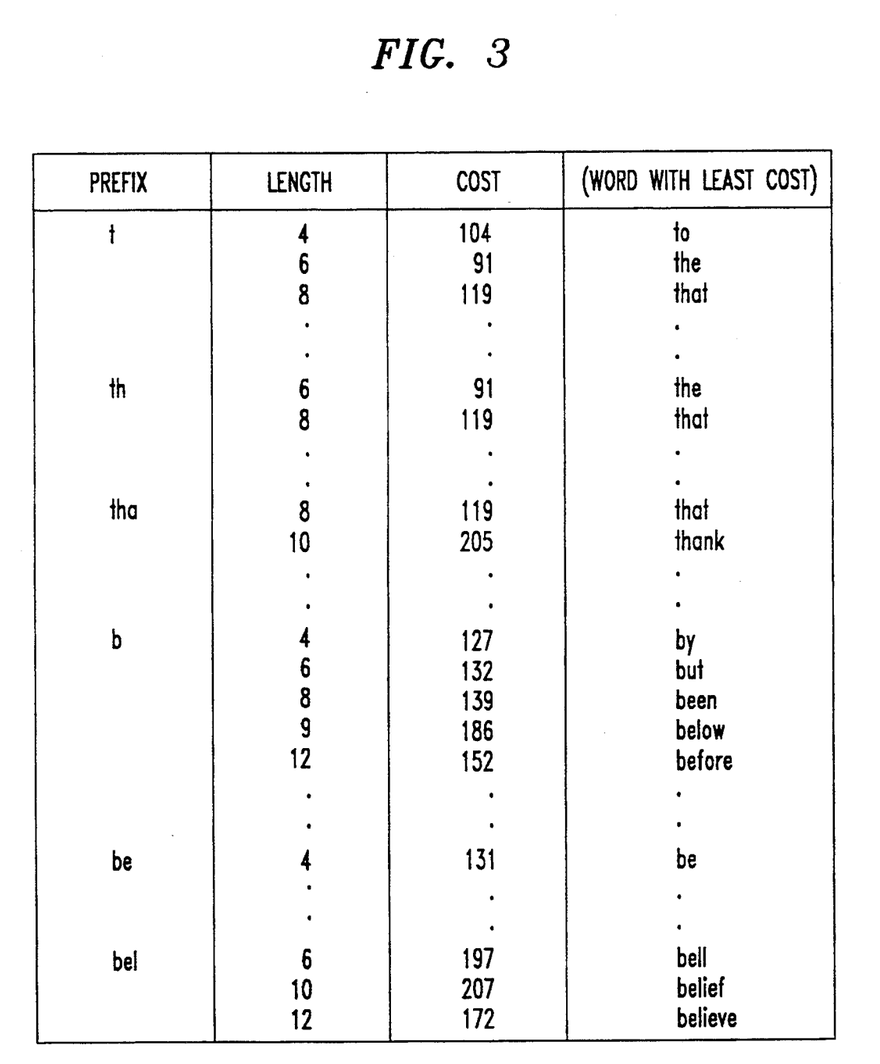
FIG. 3 presents a few entries in a text attributes table, providing cost measures keys to word prefixes.

The a text attribute table, thus, has three columns: a prefix, word length, and the probability measure of the most probable word having that prefix and word length (the identify of that "most probable" word is not kept). This is illustrated in FIG. 3.

Branch-and-Bound Procedure

Following the training phase and creation of the tables described above, the system is ready to accept lines of text perceived by the OCR equipment. The lines of text contain strings of characters that are typically delimited, such as with a space interval. The space is typically accounted for with a space character. Each of the delimited strings of characters has a meaning. In text, such as a newspaper story, each of the strings is a natural language word, optionally with punctuations attached.

The branch-and-bound procedure described below operates on the delimited strings of characters. The procedure analyzes the line of text by individually analyzing the delimited strings of characters that make up the line of text and the analysis is typically carried out in the order of character string appearance in the line of text.

Figure 4:
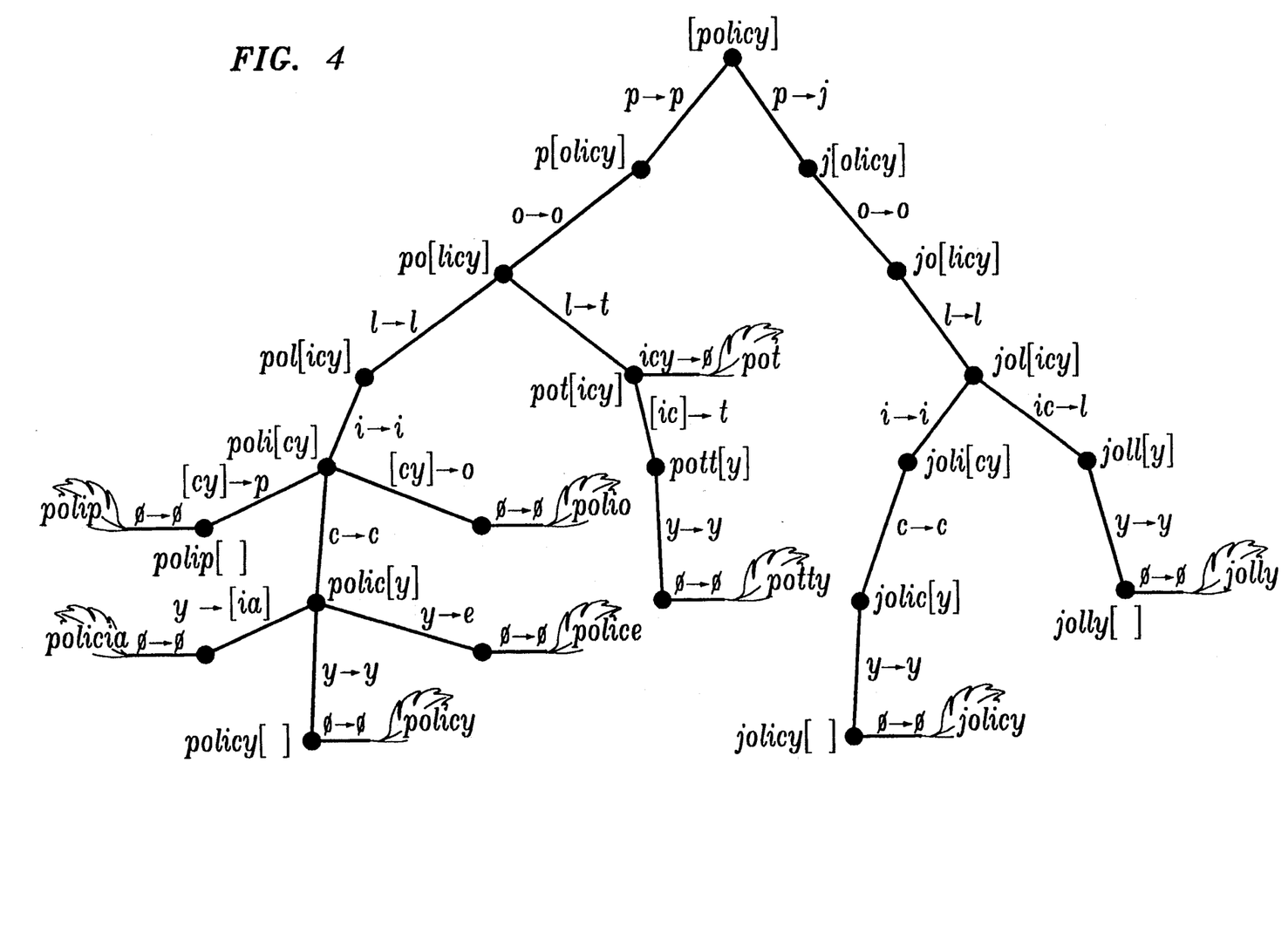
FIG. 4 illustrates a trie structure employed in a branch-and-bound procedure.

The branch-and-bound procedure is a relatively conventional procedure of traveling through branches and nodes of a trie, such as shown in FIG. 4. Lines from one node (dark circle) to another node are branches of the trie, and the leaf-looking icons attached to some nodes are leaves of the trie. The idea is that when a string of characters is presented, one travels from the root (at the top of FIG. 4) to a leaf. The travel is from one node to the next, via branches that connect the nodes, associating each branch with an executed rewrite rule.

While traversing a branch, an "expense" is incurred in connection with the traversal of the branch; i.e., with the executed rewrite. That expense is the $-10 \log p$, where p is the rewrite probability in the rewrite probabilities table. In our arrangement, there is also an expense in selecting a leaf. This is the expense found in the uni-gram word probabilities table.

Thus, there is an overall expense that is associated with reaching a leaf. Finding the leaf that has the overall lowest expense corresponds to finding the word that is the most probable characterization for the word contained in the given input string.

In going through the branch-and-bound procedure, the process starts by selecting what might be expected to be the most-probable path; i.e., the path consisting identity rewrite branches. This corresponds to assuming that the recognized characters are the true characters. In accordance with this invention, the cost of reaching a leaf is equal to the sum of the costs of the traversed branches, plus the cost of the reached leaf. As indicated above, these costs are obtained from the rewrite probability table and from the word probabilities table. This is the current selected leaf.

Next, the process backs off from the current selected leaf and attempts to find other leaves with a lower path cost. At each node to which the process backs off a determination is made as to whether it is useful to continue downward from that node, or whether one may forgo investigation of the unselected paths flowing from that node. One may forgo investigating paths when it is clear that the cost of all leaves reachable via those paths will exceed by a substantial amount the cost of the current lowest cost. This determination is made by considering the cost of arriving at that node and by considering a "most optimistic" cost of proceeding down from that node. Proceeding down from the current node may mean proceeding to a leaf, or proceeding to a lower level through a branch. To explain, even when the branches traversed by the path account for less than all of the characters in the input string, it is nevertheless possible to proceed to a leaf. However, moving to a leaf at this point of the procedure does incur the cost of transforming the remaining characters in the input string to a null. Conversely, proceeding to a branch rather than to a leaf when all of the input characters have been accounted for is also possible but this, too, represents an additional cost. In this case, it is the cost of transforming a null to a character (or, perhaps, the cost of rewriting the last character into two characters).

The total number of possibilities that need to be considered when the branch-and-bound process is at one of the lower nodes is much smaller than the total number of possibilities that need to be considered at one of the upper nodes. Hence, significant gains in operational speed can be achieved by providing a simple and quick mechanism for obviating the need to branch to lower nodes when the process is at the upper nodes. That is exactly the function of the text attribute table. As described above, the text attribute table maintains up to three letter prefixes. This corresponds to the first three levels (the upper level group) in the FIG. 4 trie.

In accordance with the principles of our invention, therefore, when a node in the upper level group is reached, a determination is made of the most optimistic cost that can be encountered when proceeding down to lower level branches. That cost is the cost provided in the text attributes table for the prefix designating the considered branch, taking into account the width of the input string under consideration. When that most optimistic cost is higher (by more than a preselected threshold value) than the cost of the highest-cost candidate that has not been discarded, then that branch and all branches below it are not considered further.

A similar enhancement in operational speed can be obtained, "on the fly", for the remaining, lower level group of nodes by computing a most optimistic cost when the process is at the node. The most optimistic cost is the cost of 1-to-1 rewrites from the current node, plus the cost of the most likely word, given the string of characters that are established at the current node (i.e., the collection of characters associated with the path leading to the current node). When considering the "most likely word", the width of the remaining portion of the string can also be taken into account.

While proceeding with the branch-and-bound process, candidates that, at the moment, are less probable than a previously identified candidate are not discarded. The number of candidates that are kept is a designer's choice. It can be a function of the cost differential between the candidate's cost and the current lowest cost, or it may be a fixed number of candidates.

It should be pointed out that the FIG. 4 trie is not a static arrangement. Rather, it a trie that is "grown" for the particular input that is provided. In the case of FIG. 4, the input is the word "policy" and myriad different paths are shown for that input string. Some of the paths lead to valid English words, and some may lead to invalid words. The FIG. 4 illustration is not exhaustive for the various paths that can be grown for the given input string, and it is not descriptive of the less costly paths. It is merely illustrative of the trie that is created through the various rewrite rules.

Figure 5:
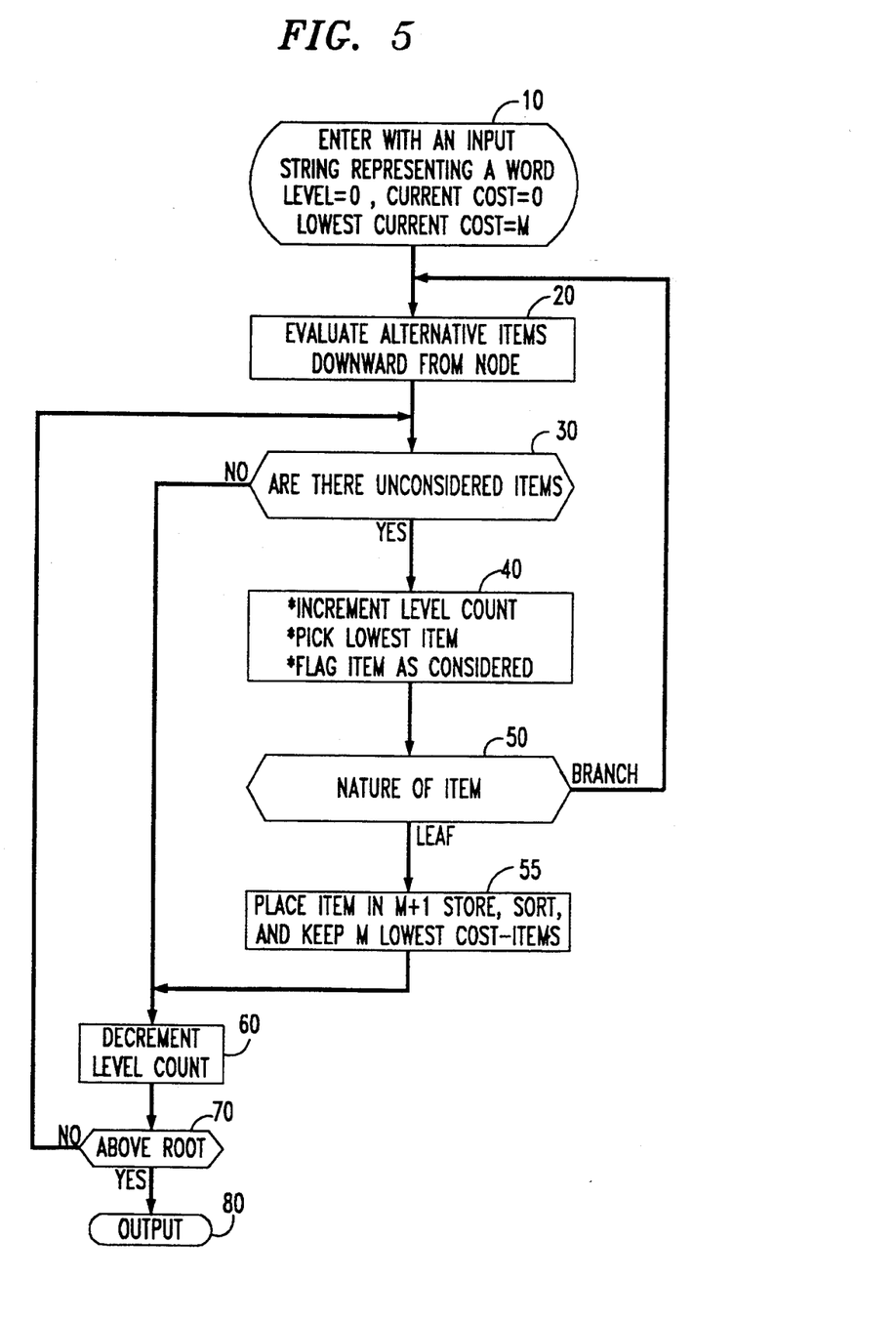
FIG. 5 provides a flowchart of the branch-and-bound procedure.

The process of above branch-and-bound procedure is basically depicted in FIG. 5. The process of FIG. 5 is entered at block 10 with a string of space delimited characters, placing the branch-and-bound process at the root node of FIG. 4. Block 10 also sets the level count to 0, the current cost to 0 and the current lowest cost measure to some chosen large number, M. This is the current node.

Proceeding to block 20, an evaluation is undertaken of all items that stem from the current node. An item is either a branch connected to the node or a leaf connected to the node.

The evaluation in block 20 first assesses whether there are any items stemming from the current node that have not been considered (i.e., not flagged). If there are any, then block 20 determines whether it makes sense to investigate those items. As discussed above, this determination is made based on the text attribute table, if the current node is in the upper level group of nodes, or based on the alternative computed method when the current node is in the lower level group of nodes. If the determination concludes that it is not advisable to investigate the paths leading through a particular branch, then this branch is flagged to indicate that it has been considered and control passes to block 30.

Block 30 determines whether there are items stemming from the current node that have not been considered. A determination that all items have been considered passes control to block 60, while the opposite determination passes control to block 40. Block 40, selects the item with the lowest associated cost, adds that cost to the current cost, moves to a new current node by incrementing the level count, and flags the branch just traversed as having been considered. Control then passes to block 50 which determines whether the item handled in block 40 is a branch or a leaf. When a leaf is not present in the current node, in a sense that it is not found in the word probabilities table, it is nevertheless created in accordance with equation (2) and considered.

When the item handled in block 40 is a branch, block 50 passes control to block 20 to investigate the possibility and advisability of proceeding down to a lower level on the trie.

When the item handled in block 40 is a leaf, block 50 passes control to block 55 which adds the word cost (from the word probabilities table) to the current cost, obtaining thereby an overall cost for the word represented by the leaf. That word and its associated overall cost are placed in a word output queue. The queue may be one that maintains only words that have an overall cost measure which is within a preselected bound of the lowest cost word. Or, the queue may be one that maintains no more than m of the lowest cost word candidates, where m is a preselected number. When many good candidates exist, limiting the number of candidates to m, in effect, reduces the threshold of acceptability. The former approach can be easily implemented with a straight forward calculation, while the latter approach can be easily implemented by adding the new word entry supplied by block 40 to an m+1 list, sorting the list by cost, and keeping only the m lowest cost members. It may be desirable to not maintain entries with a cost that is greater than some threshold, in which case, both a threshold calculation and a sort limited to m entires must be carried out.

When block 30 determines that all items of a node have been considered, the task is to back up the trie of FIG. 4. That action is accomplished by block 60 which decrements the level count. When a leaf is handled in block 55 then the process is handling the only item of what effectively is a node. Therefore, when block 55 terminates its actions, control also passes to block 60.

As observed earlier, a change in the level count is tantamount to moving up and down the trie. In the case of block 60, the movement is up toward the root. Therefore, block 70 follows the actions of block 60 with a determination of whether the level reached is level −1 (above the root). When the level reached is not above the root, control passes to block 30. Otherwise, the process of FIG. 5 enters output block 80. Block 80 offers the words maintained in the word queue, together with their costs, to the next phase in the overall process.

In summary, in response to a sequence of input strings, the process of FIG. 5 produces a sequence of output string sets ($W_i$, where $W_l$ is the first string set, and $W_n$ is the $n^{th}$ string set). Each set corresponds to a space delimited input string and comprises a number of candidate strings that are ordered by a cost measure. The number of candidates in each set will most likely be greater than one (although it is possible for a set to have only one candidate). For example, even a word like "Oz", which contains only two letters and one of them is the relatively unusual letter "z", the word "as" might have a low enough cost to be included in the set.

Low Likelihood Results

Having obtained a sequence of string sets from the branch-and-bound process of FIG. 5, it is possible that the lowest cost candidates in some string sets (i.e., the best candidates) are nevertheless unreasonably costly. This occurs most often when strings are split up and/or combined in the processes that precede the branch-and-bound process. For example, the input strings "aard" and "vark", should they come into the branch-and-bound process as two separate strings, are likely to yield relatively high cost candidates because the strings do not form recognized words. When combined, however, the cost may be quite low.

To account for this possibility, an attempt is made to combine (or take apart) input strings when the candidate strings those input strings have unreasonably high costs. The modified strings are then reapplied to the branch-and-bound process of FIG. 5 for cost evaluation.

Figure 6:
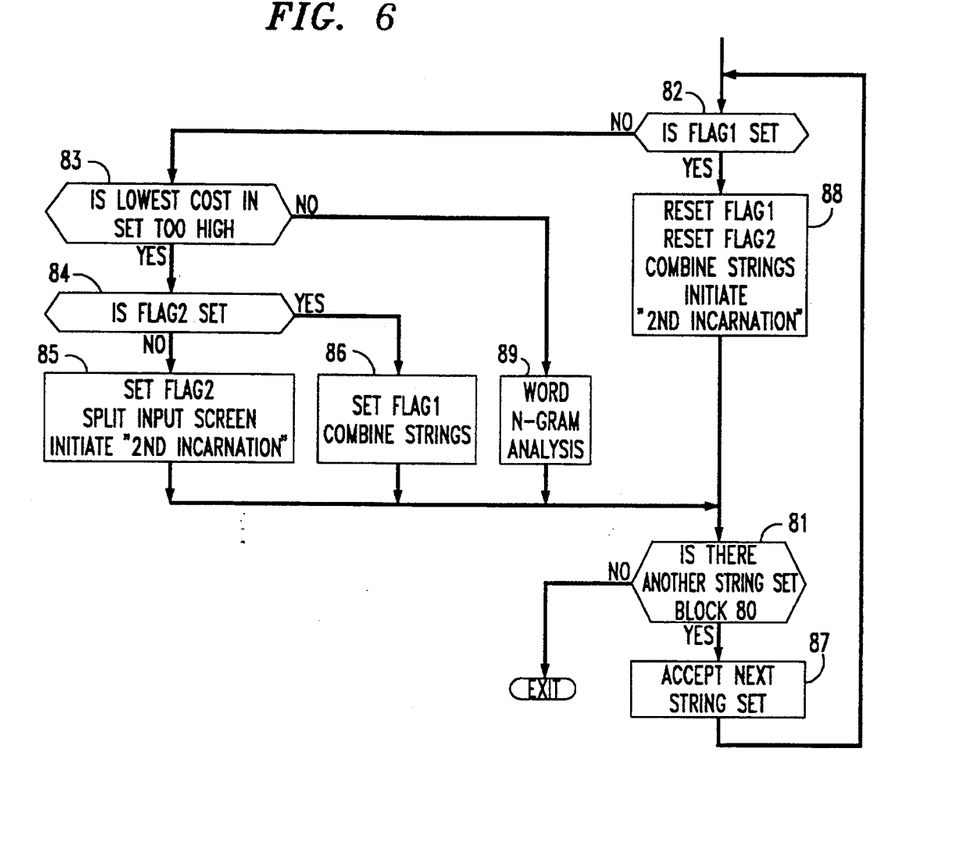
FIG. 6 provides a flowchart for splitting and/or combining words.

This is depicted in FIG. 6, where the process begins with the first set of candidate strings being applied to block 82 which determines whether a flag1 is set. When it is not, control passes to block 83 which evaluates the string set to determine whether the lowest cost member in the evaluated set is too high. When the cost is not too high, the string set is accepted into block 89, and control passes to block 81. Block 81 determines whether there are additional string sets in block 80 that need to be analyzed. If there are such sets, then block 87 accepts the next set of strings and passes control to block 82. Otherwise, the process ends. When block 83 determines that the cost is too high, a determination is made in block 84 whether a flag2 is set.

The condition that flag2 is not set corresponds to a need to split the input string. Control passes to block 85 which splits the input string, sets flag2 and initiates a "second incarnation" of the FIG. 5 and FIG. 6 processes to evaluate the strings developed by the splitting process. The splitting can be effected in a number of ways. One way, for example, may be selecting the initial string based on the most probable word having the prefix of the input string, and leaving what remains of the input string for the subsequent string.

A determination in block 84 that flag2 is set indicates that a previous split of the input string did not yield good candidates. Hence, the strings that resulted from the previous split are combined in block 86, flag1 is set, and control returns to block 81.

The next string set is accepted by block 87; but now flag1 is set. Therefore, control passes from block 82 to block 88 which resets flag1, resets flag2, combines the two input strings and initiates a "second incarnation" of the FIG. 5 and FIG. 6 processes to evaluate the set of candidates developed in response to the combined input string. Following block 88, control passes again to block 81. Of course, when the cost is not too high, the string sets should be accepted, and that is achieved by passing the string sets to block 89 when the appropriate condition is met. It may be noted that the combining of strings may result in even a worse cost condition. That situation is reversible, however, because the "second incarnation" of the FIG. 6 process initiated by block 88 will induce a split in block 85.

Word n-grams

In the next phase of the knowledge source-based recognition process of this invention, a determination is made as to which of the strings in the string sets delivered by block 89 should be selected as the final representatives of the input string of characters; i.e., selected for the final output string.

The strings contained in the string sets delivered to block 89 are, in effect, the most likely strings, given the information that is known about single word probabilities and the error characteristics of the OCR equipment. The word n-gram phase within block 89 adds the knowledge known about word di-grams. Specifically, the various word pair combinations that can be created from successive word sets are analyzed by considering the cost of a first word, the cost of the second word, and the cost of a di-gram that contains both words. Typically, the process advances in one direction, such as from left to right. Having decided on the left word, $WD_i$, (W stands for "word", D stands for "decided", and i stands for the position of the word in the text) the candidates of the set to the right, $WC_{i+1}$, (C stands for "candidate") are evaluated and one member of the set is tentatively selected based on a cost measure. That cost measure combines the cost of each word in the set as provided to block 89 with the cost of the di-gram that the selection creates, based on the di-gram dictionary table.

Candidate Proposals

While the string sets provided by block 89 contain the strings that are very likely to be included in the final output string, a procedure is provided for accepting candidate strings. The motivation for this additional procedure is rooted in the concern that the sets $W_i$ do not contain the right candidates for best application of the word n-gram process. It is conceivable, for example, that the three consecutive sets of strings from the FIG. 5 process contain the words "hands", "bands" and "lands" in one set; the words "of", "off", and "or" in the second set; and the words "experiment" and "experi-ments" in the third set. When the text in the field of education, and more particularly, in the field of science education, it may turn out that the phrases "hands on experiment" and "hands on experiments" are substantially more likely than all other phrases that can be constructed from the three sets. In such a case, it is not unreasonable to assume that the word "on" in the middle set was inadvisably discarded in favor of the three words that were included in the set. In view of the probabilities in the information corpus, however, it makes sense to offer the word "on" as a candidate and to evaluate its probability measure in accordance with the FIG. 5 process, even if that measure is lower than that which would otherwise suggest keeping that candidate. Increasing thereby the set of words in the second set allows testing for the string "hands on experiment". Of course, that may imply that when traversing the FIG. 4 trie some rewrites may need to take place that are not included in the rewrite probabilities table. Equation (3) can then be employed to develop a cost measure for the necessary rewrite. The candidate proposal process is depicted in FIG. 7.

Figure 7:
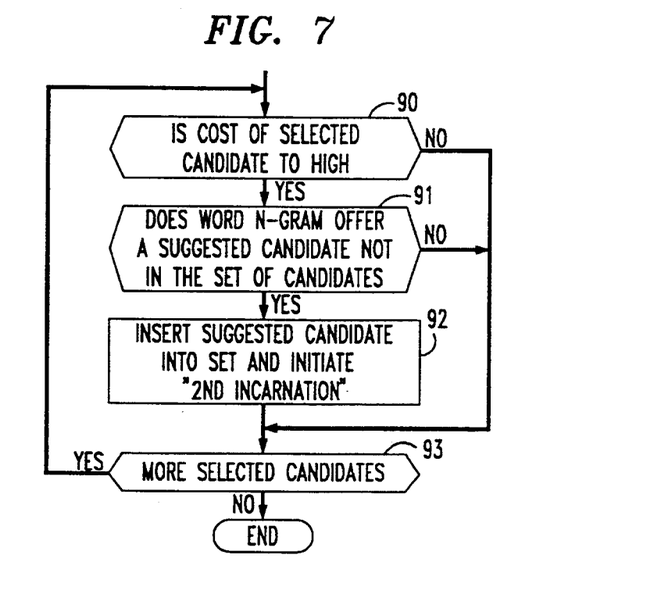
FIG. 7 provides a flowchart for suggesting candidate words.

In FIG. 7 block 90 determines whether the cost of a selected candidate is too high. When it is, block 91 evaluated whether any one of the available word n-grams (e.g., the word tri-gram) can offer a suggested candidate that was not considered in the original set of candidate strings. An affirmative determination passes control to block 92 which inserts the suggested candidate in the set of candidate stings and initiates a "second incarnation" of the FIG. 5 and FIG. 6 processes to evaluate the suggested candidate. After the suggested candidate is evaluated, and when the determination in blocks 90 and 91 is negative, control passes to block 93. When there are other selected candidates to consider, control returns to block 90. Otherwise, the process terminates.

As an aside, the above describes an approach where candidate strings (words) are proposed only when the word di-grams and tri-grams suggest that the available words do not represent very likely strings of words. However, such candidate suggesting can be done all time.

Punctuations

During the rewrite phase of the branch-and-bound punctuations are part of the blank delimited string. They can be kept with the words to which they attach throughout the process, or they can be split off immediately to form independent "words". The latter, in effect, introduces a mapping that adds a space. The punctuation characters can also be split off just prior to the application of the word di-grams procedures.

We claim:

1. A method responsive to a collection of input characters comprising the steps of:
    separating the collection of input characters into input character strings;
    for each one of the input character strings, forming at least one set of candidate output strings, with most of the sets containing more than one candidate output string: and
    based on probability measure related to the occurrence of input character combinations and probability measure related to the occurrence of an output string having a given string of characters, selecting one candidate output string from each of the sets as a determined output string of the set wherein said step of forming a set of candidate output strings carries out an iterative search procedure with the aid of a rewrite probabilities table and a word probabilities table.

2. The method of claim 1 wherein said input character strings are delimited by a preselected space character.

3. The method of claim 1 wherein the step of forming a set of candidate output strings creates each candidate output string by rewriting groups of m characters of the input string into groups of n characters of the candidate output string, where m and n are unconstrained to be equal to each other, are unconstrained to be the same for successive groups of characters making up the input string and the candidate output string, and the number of characters in each candidate output string in the set is unconstrained to be equal to the number of characters in any other candidate output string in the set.

4. The method of claim 3 wherein the step of forming a set of candidate output strings still further comprises the step of removing a candidate output string from said set of candidate output strings when the number of candidate output strings in the set exceeds a preselected value.

5. The method of claim 3 wherein the step of forming a set of candidate output strings further comprises the step of removing a candidate output string from said set of candidate output strings when the number of candidate output strings in the set exceeds a preselected value.

6. The method of claim 1 wherein the step of forming a set of candidate output strings creates each candidate output string by m-to-n character rewrites, where m is the number of input string characters, n is the number of candidate output string characters and both m and n are unconstrained to independently take on any value within the range 0 to 3 characters.

7. The method of claim 1 wherein the step of forming a set of candidate output strings comprises the steps of:
converting the input character string to a candidate output string by rewriting groups of input characters which, when concatenated, form the input character string, into groups of output characters which, when concatenated, form the candidate output string, where corresponding groups of input characters and output characters are unconstrained to have an equal number of characters;
forming a candidate cost measure for the candidate output string created by the step of converting by combining costs associated with the rewriting of groups of input characters, as carried out in the step of converting, and adding thereto a cost measure representative of the likelihood of occurrence of the candidate output string;
tentatively adding the candidate output string to the set of candidate output strings when the candidate cost measure is within a threshold of the lowest candidate cost measure of candidate output strings already in the set of candidate output strings, and returning to the step of converting as long as a possibility exists that candidate output strings can be found with a candidate cost measure that is within said threshold.

8. The method of claim 7 wherein the steps of converting the input string and forming a candidate cost measure are carried out interactively, with the cost measure being updated with each rewrite carried out in the step of converting.

9. The method of claim 8 where with each rewrite carried out in the step of converting and updating of the candidate's cost measure, the candidate's most optimistic final cost measure is estimated.

10. The method of claim 9 where the estimate is derived from a table of candidate costs based on known initial characters rewritten for the candidate.

11. The method of claim 9 where the estimate is derived by combining the candidate's updated cost measure with a lowest cost measure of a candidate string having the characters rewritten for the candidate, derived from a word probabilities table.

12. The method of claim 9 where the estimate is derived by combining the candidate's updated cost measure with a lowest cost measure of a candidate string having the characters rewritten for the candidate and the width of the input string, derived from a word probabilities table.

13. The method of claim 8 where the step of converting is aborted prior to its termination when the candidate cost measure is anticipated to exceed the lowest candidate cost measure of a candidate output string already in the set of candidate output swings by more than the threshold.

14. The method of claim 13 where a determination is made that the candidate cost measure is anticipated to exceed the lowest cost of a candidate output string already in the set of candidate output strings by more than the threshold on the basis of a table that is keyed to a prefix of the input string.

15. The method of claim 13 where a determination is made that the candidate cost measure is anticipated to exceed the lowest cost of a candidate output string already in the set of candidate output swings by more than the threshold on the basis of a table that is keyed to a prefix of the input swing and to the width of the input string.

16. The method of claim 15 where the width of the input string is related to the nature of the characters in the input string and to their number.

17. The method of claim 15 wherein the step of forming a set of candidate output strings further comprises the step of removing a candidate output string from said set of candidate output strings when the candidate cost measure of that candidate output string exceeds the lowest cost measure or some candidate output string in the set by said threshold.

18. The method of claim 1 wherein the word probabilities table is augmented with a process for determining the probability of a word that is not present in the word probabilities table.

19. The method of claim 18 wherein the process for determining the probability of a word that is not present in the word probabilities table comprises evaluating the expression $$\left\{ \prod_{i=0}^{n} p_i \right\}^{\frac{1}{n+1}} C_{rare},$$

where n is the number of letters in the word, $C_{rare}$ is some selected estimate of a real word existing which the training session hasn't seen, and $p_i$ is the probability of the $i^{th}$ letter digram of the unknown word generally occurring in text.

20. The method of claim 1 wherein said iterative search procedure is a branch-and-bound procedure.

21. The method of claim 1 wherein said step of selecting considers probability measures of occurrence of triplets of character strings
wherein the first string in the triplet of character strings is a previously determined output string of a set, the second string in the triplet of character strings is a candidate output string in the set of candidate strings that is adjacent to the first string, and the third string in the triplet of character strings is a candidate output string in the set of candidate strings that is adjacent to the set of the second string, where the selection is made of a determined output swing in the set of the second string.

22. The method of claim 1 further comprising a step of augmenting a set of candidate output strings with a suggested candidate output string.

23. The method of claim 1 wherein the step of forming a set of candidate output swing comprises a step of augmenting a previously formed set of candidate output strings with a suggested candidate output string.

24. The method of claim 23 wherein said step of augmenting derives the suggested candidate output string from a word di-gram probabilities table.

25. The method of claim 23 wherein said step of augmenting derives the suggested candidate output string from a word tri-gram probabilities table.

26. The method of claim 23 wherein said step of augmenting derives the suggested candidate output string from a word n-gram probabilities table, where n designates the number of words in the set of words for which the n-gram probabilities table provides probability values.

27. The method of claim 1 wherein an input character string is effectively split into a number of input character strings by the step of forming a corresponding number of sets of candidate output strings, with a delimiter which separates character strings that are recognized as valid character strings on either side of the input character strings.

28. The method of claim 1 further comprising a steps of:
combining at least two of the input character strings created in the step of separating, to form a modified input character string;
forming an X set of candidate output strings for the modified input character string; and
based on probability measures related to the occurrence of character string input character sequences, selecting one candidate output string from the X set as a determined output string of the X set.

29. A method responsive to a collection of input characters comprising the steps of:
separating the collection of input characters into input character strings;
for each one of the input character strings, forming at least one set of candidate output strings, with most of the sets containing more than one candidate output string; and
based on probability measure related to the occurrence of input character combinations and probability measure related to the occurrence of an output string having a given string of characters, selecting one candidate output string from each of the sets as a determined output string of the set
wherein said step of selecting considers probability measures of occurrence of pairs of character strings
wherein the first character string in the pair of character strings is a previously determined output string, and the second character string in the pair of character strings is a candidate output string in the set of candidate output strings that correspond to an input character string which is adjacent to an input character string that corresponds to the first character string.

* * * * *